United States Patent
Reid

(10) Patent No.: US 12,176,113 B1
(45) Date of Patent: Dec. 24, 2024

(54) MODERATED NUCLEAR REACTOR

(71) Applicant: Triad National Security, LLC, Los Alamos, NM (US)

(72) Inventor: Robert Stowers Reid, Santa Fe, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 174 days.

(21) Appl. No.: 17/176,752

(22) Filed: Feb. 16, 2021

(51) Int. Cl.
| | |
|---|---|
| G21C 15/08 | (2006.01) |
| G21C 5/02 | (2006.01) |
| G21C 15/02 | (2006.01) |
| G21C 15/04 | (2006.01) |
| G21C 15/257 | (2006.01) |

(52) U.S. Cl.
CPC ............. *G21C 15/08* (2013.01); *G21C 5/02* (2013.01); *G21C 15/02* (2013.01); *G21C 15/04* (2013.01); *G21C 15/257* (2013.01)

(58) Field of Classification Search
CPC .......... G21C 5/02; G21C 15/257; G21C 5/12; G21C 11/08; G21C 5/00; G21C 5/18; G21C 1/12; G21C 11/085; G21C 11/086; G21C 15/08; F28D 15/02; G21D 5/02
See application file for complete search history.

(56) References Cited

U.S. PATENT DOCUMENTS

| | | | | |
|---|---|---|---|---|
| 3,285,822 | A * | 11/1966 | Tunstall ................ | G21C 7/27 376/209 |
| 3,302,042 | A * | 1/1967 | Grover ................. | G21D 7/04 976/DIG. 188 |
| 5,867,552 | A * | 2/1999 | Marlowe ............... | C22C 16/00 420/422 |
| 2007/0183919 | A1* | 8/2007 | Ayer .................... | B22F 3/1125 75/415 |
| 2017/0249999 | A1* | 8/2017 | DeWitte ............... | G21C 7/02 |
| 2021/0335510 | A1* | 10/2021 | Loginov ............... | G21C 1/12 |
| 2022/0013243 | A1* | 1/2022 | Miao .................... | G21C 15/08 |
| 2022/0301732 | A1* | 9/2022 | Venneri ................ | B64D 27/22 |
| 2023/0107838 | A1* | 4/2023 | Dasari .................. | G21C 1/16 376/347 |

FOREIGN PATENT DOCUMENTS

JP       H06180387       * 6/1994       ............... G21F 1/08

* cited by examiner

*Primary Examiner* — Sharon M Davis
(74) *Attorney, Agent, or Firm* — Alston & Bird LLP

(57) ABSTRACT

A heat pipe cooled nuclear reactor core ("reactor core") includes an array of fuel, an array of primary heat rejection heat pipes, and an array of moderator cooling heat pipes or thermosiphons. Each moderator cooling heat pipe in the array of moderator cooling heat pipes is surrounded by metal hydride moderator materials, slowing neutrons from a fission energy range to a lower energy range in the reactor core.

20 Claims, 15 Drawing Sheets

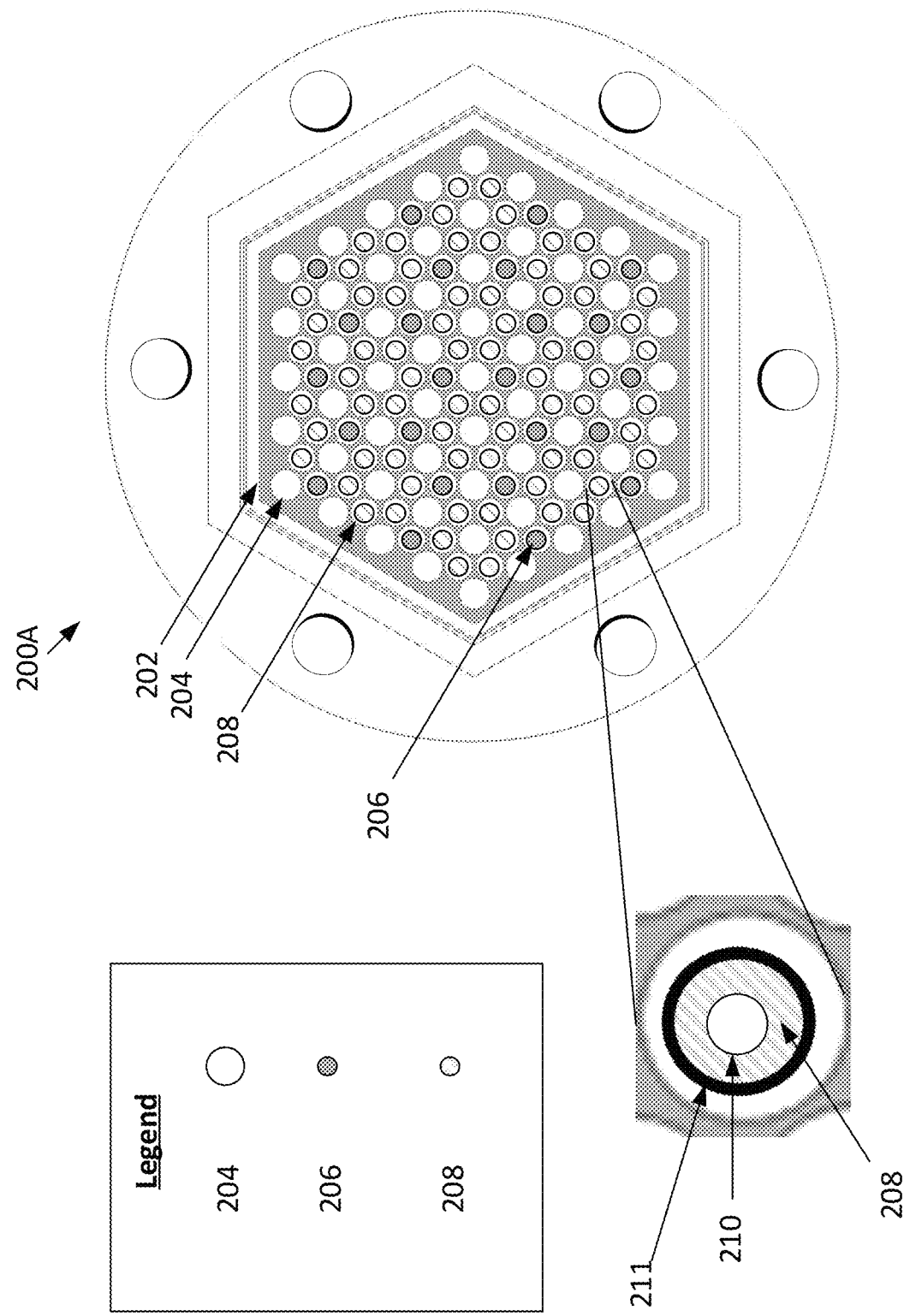

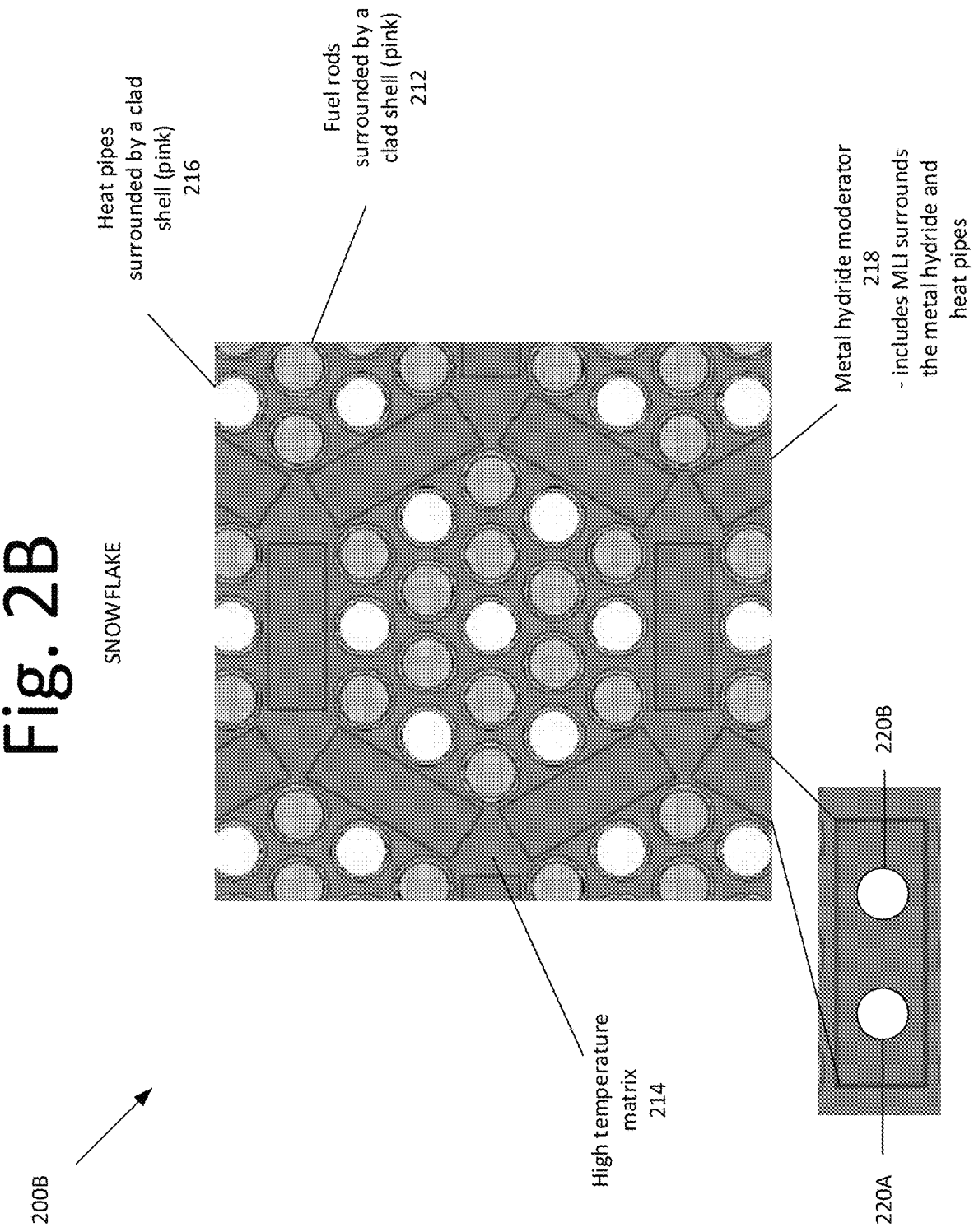

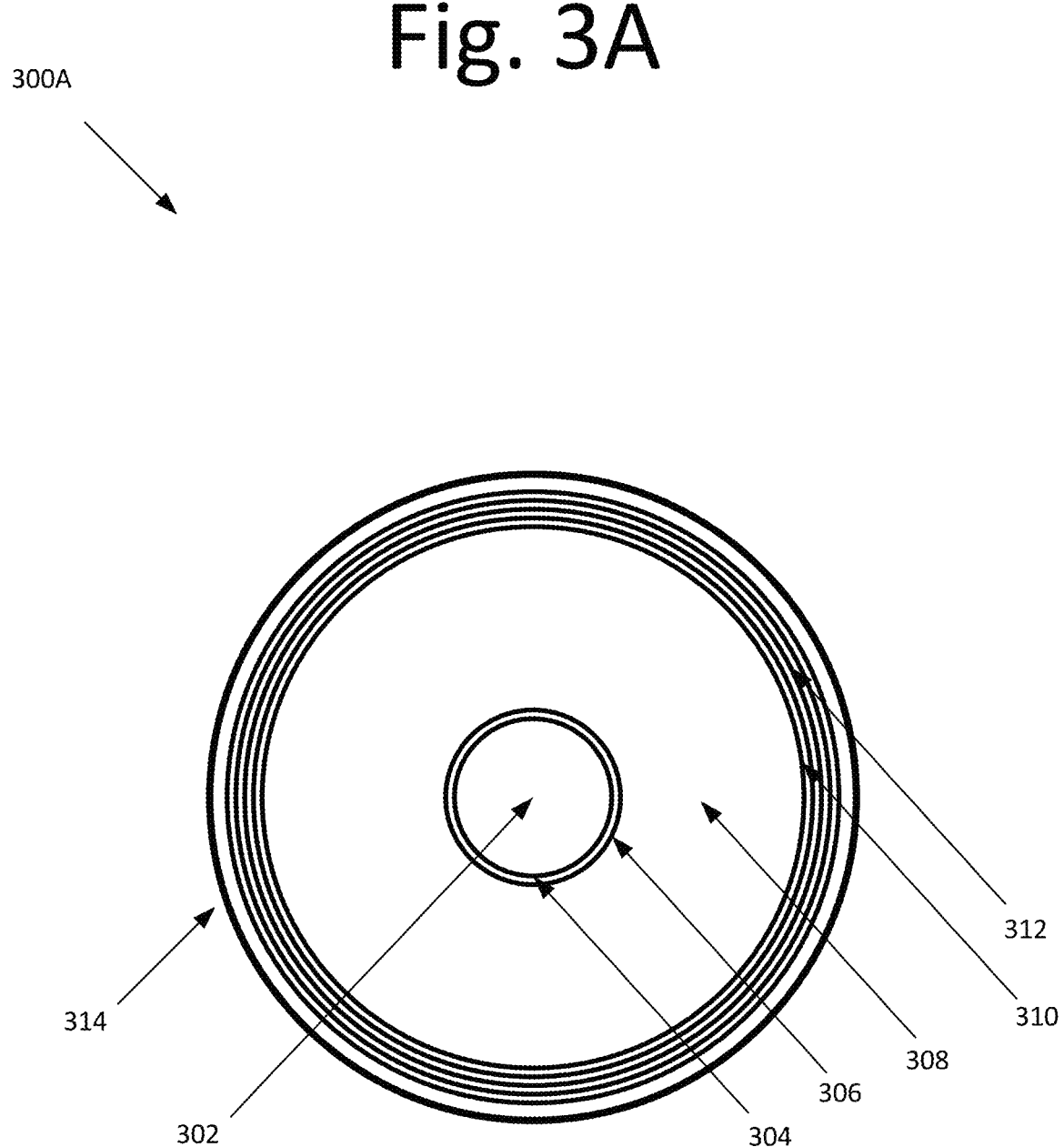

Fig. 3C
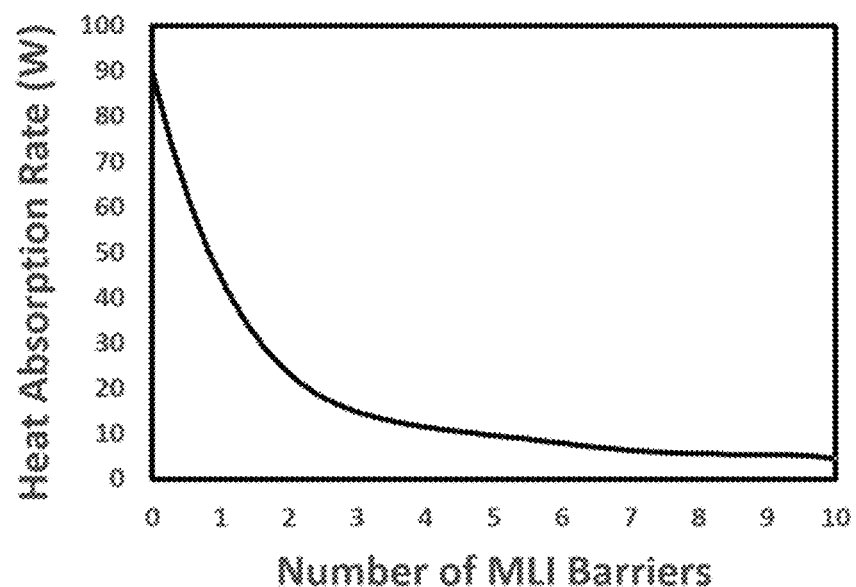
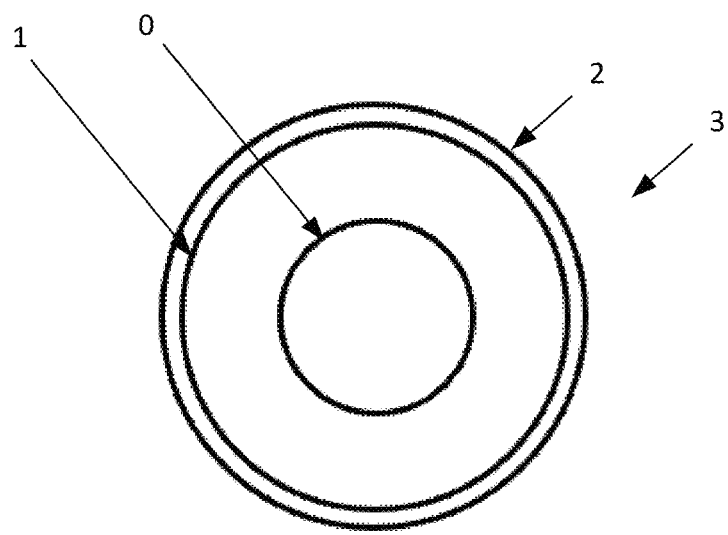

Fig. 3E

| Configuration (-) | T (°C) | $A_{moderator}$ (mm²) | n (mole) | $A_{moderator} \cdot n$ (mm²·mole) | $Q_{leak}$ (W) |
|---|---|---|---|---|---|
| A·(ZrH$_n$) | 440 | 50.7 | 1.60 | 81 | 15 |
| B·(ZrH$_n$) | 540 | 56.6 | 1.30 | 74 | 12 |
| C·(ZrH$_n$) | 480 | 65.3 | 1.55 | 101 | 33 |
| D·(ZrH$_n$) | 570 | 71.2 | 1.10 | 78 | 28 |
| A'·(YH$_n$) | 500 | 50.7 | 2.00 | 101 | 50 |
| B'·(YH$_n$) | 600 | 56.6 | 2.00 | 113 | 45 |
| C'·(YH$_n$) | 515 | 65.3 | 2.00 | 131 | 110 |
| D'·(YH$_n$) | 650 | 71.2 | 2.00 | 142 | 98 |

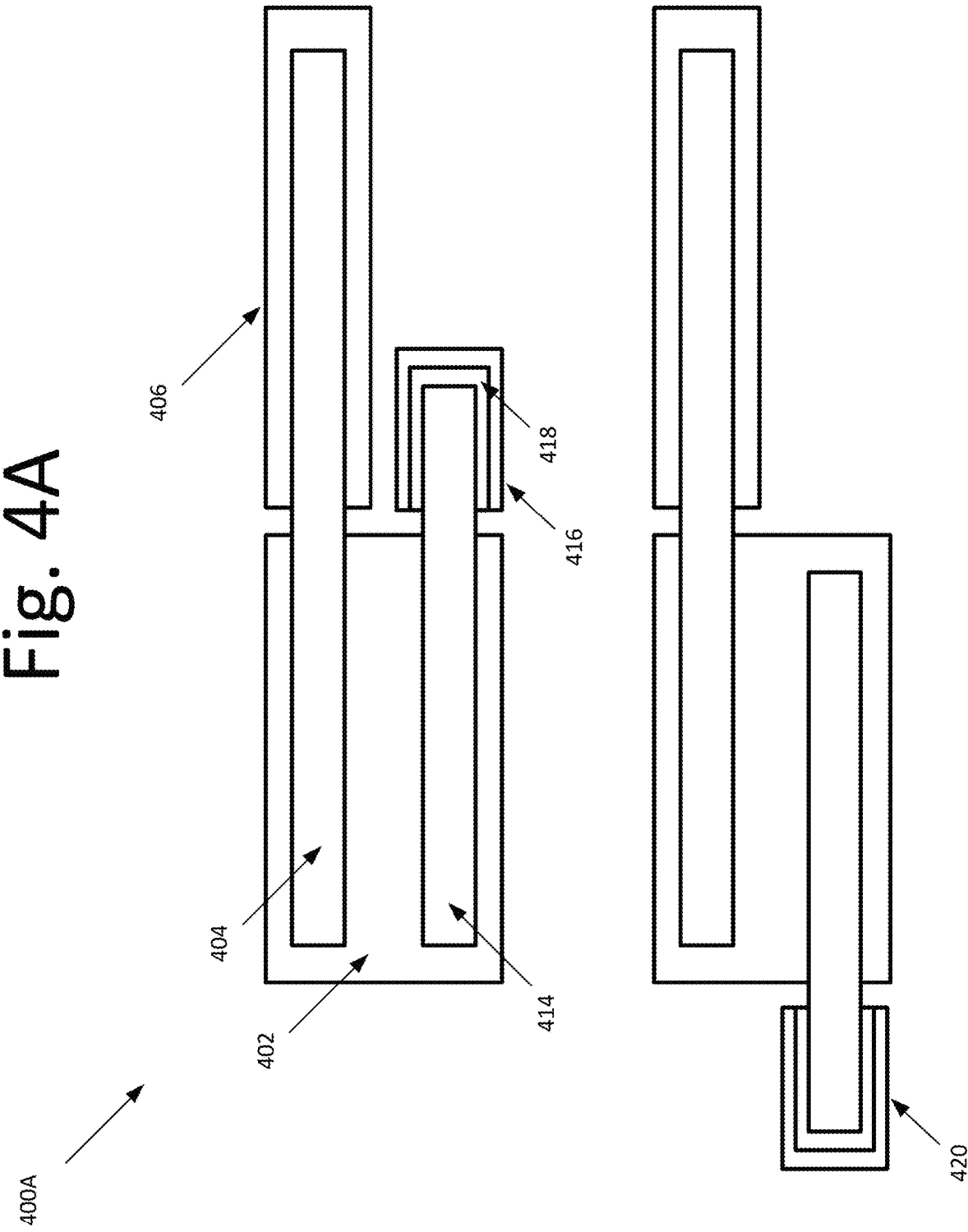

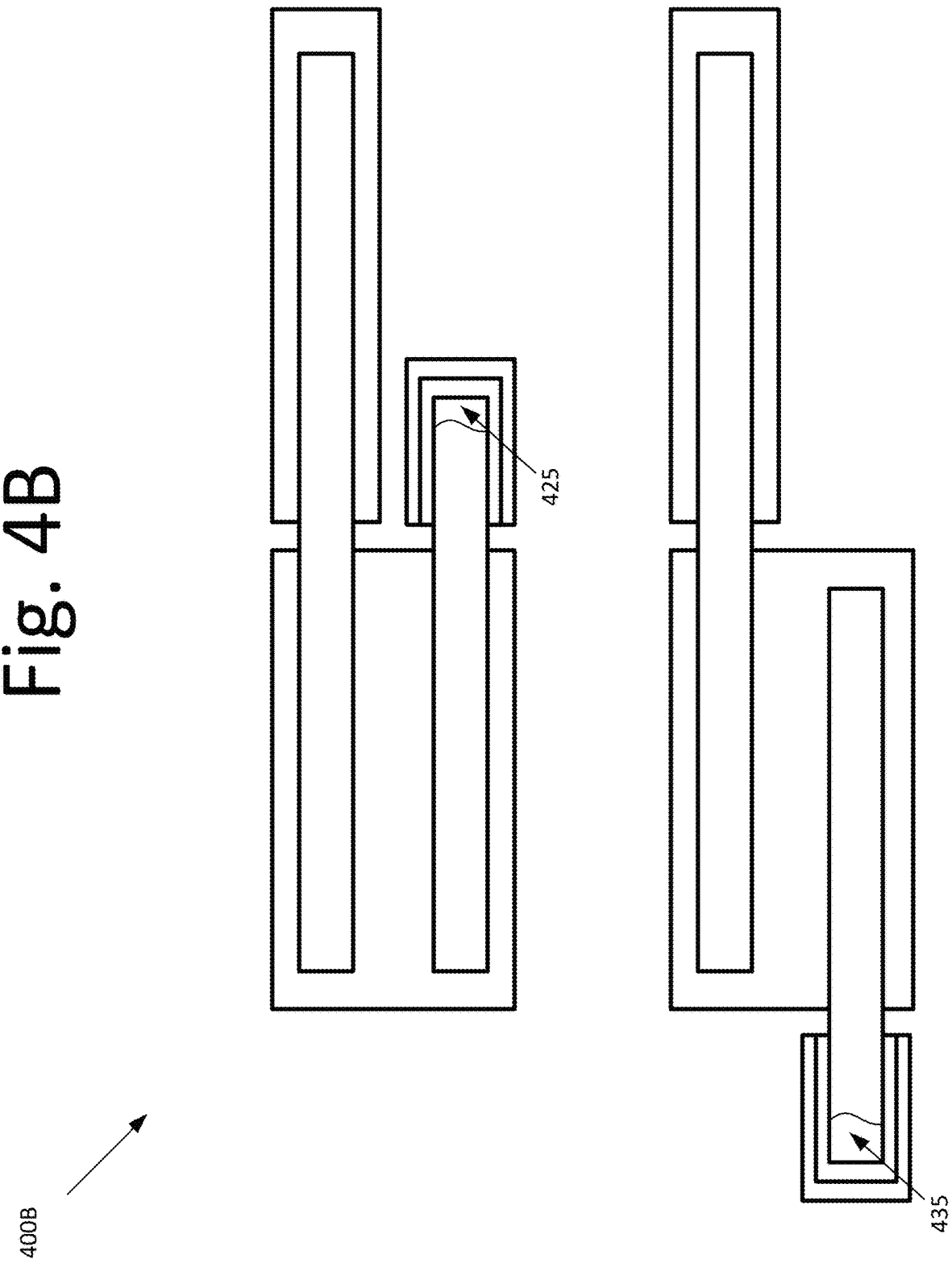

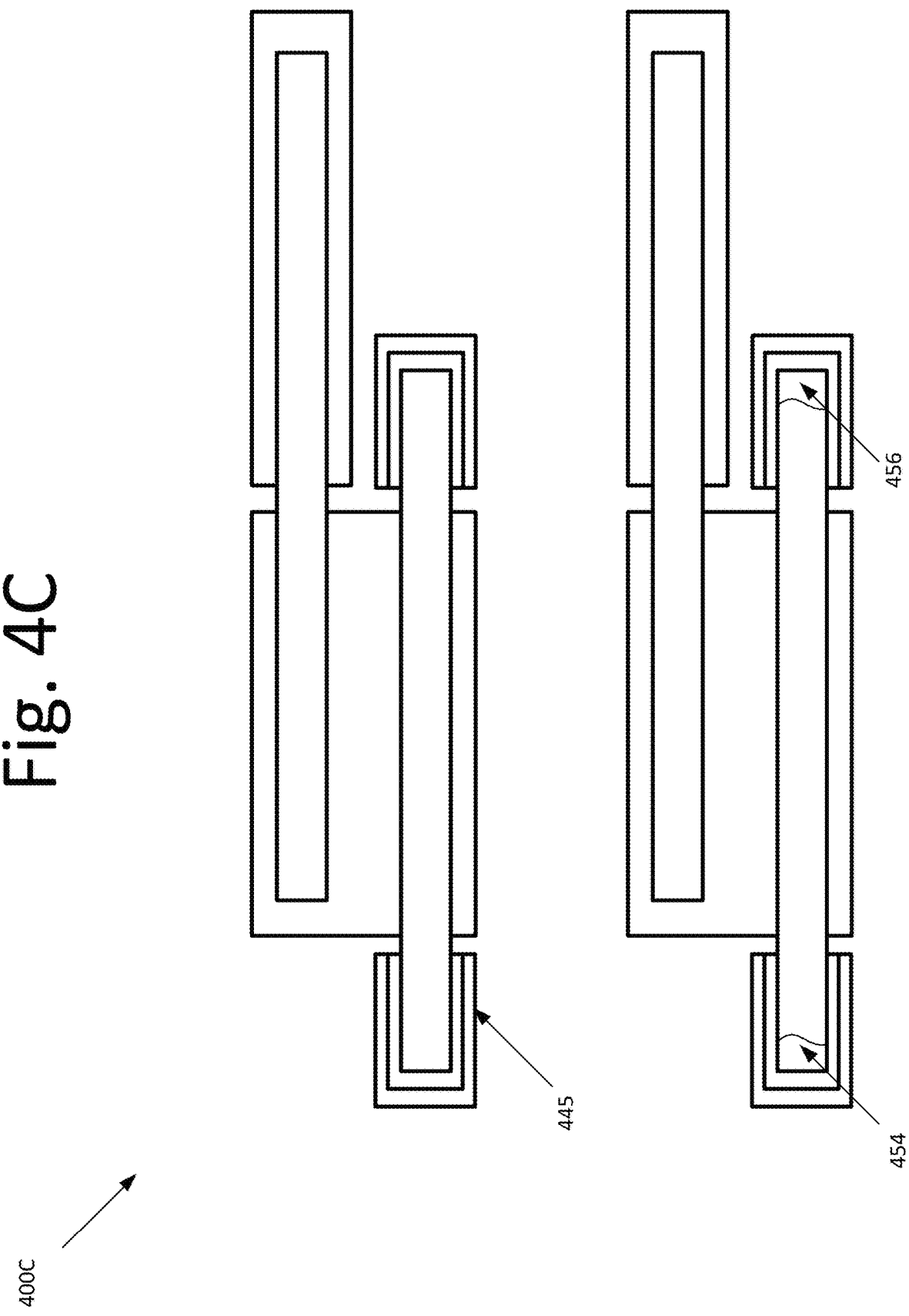

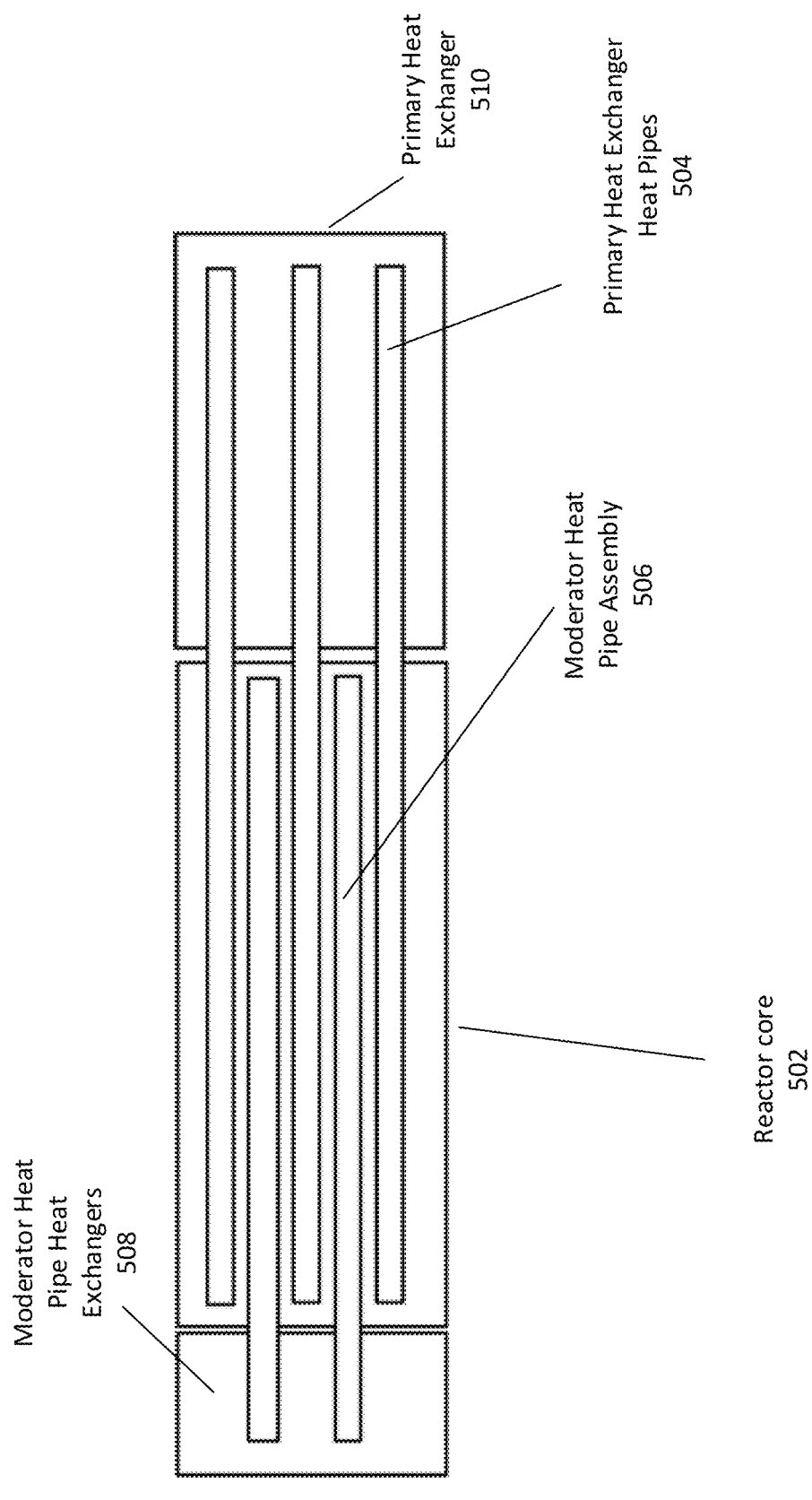

Core cross-section

Core cross-section

MODERATED NUCLEAR REACTOR

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention relates to a reactor, and more particularly, to a moderated nuclear reactor.

BACKGROUND

Neutron moderation increases fuel economy in compact nuclear reactor cores, and more specifically, in compact heat pipe nuclear reactor cores. Through conservation of momentum, low mass elements such as carbon and hydrogen can slow neutrons from fission energies in the MeV range to thermal energies in the sub-eV range. Low energy neutrons have high fission cross section with fissile nuclei facilitating an efficient nuclear fuel use. Metal hydrides perform well as moderator material at low temperature because of their higher hydrogen density at those temperatures. Metal hydrides lose hydrogen as core temperature near the metal hydride moderator increases. As core temperature increases to achieve higher power conversion efficiency, the metal hydride moderator become less effective requiring a larger core to achieve criticality.

Accordingly, an improved moderated nuclear reactor is needed.

SUMMARY

Certain embodiments of the present invention may provide solutions to the problems and needs in the art that have not yet been fully identified, appreciated, or solved by current nuclear reactor technologies. For example, some embodiments of the present invention pertain to a moderated nuclear reactor maintaining moderator effectiveness as core temperature increases.

In an embodiment, a heat pipe cooled nuclear reactor core ("reactor core") includes an array of fuel, an array of primary heat rejection heat pipes, and an array of moderator cooling heat pipes or thermosiphons. Each moderator cooling heat pipe in the array of moderator cooling heat pipes is surrounded by metal hydride moderator materials, slowing neutrons from a fission energy range to a lower energy range in the reactor core.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A is a diagram illustrating a cross-section of a nuclear reactor core, according to an embodiment of the present invention.

FIG. 2B is a diagram illustrating a cross-section of a segment of a reactor core (a unit cell), according to an embodiment of the present invention.

FIG. 3A is a diagram illustrating a moderator assembly, according to an embodiment of the present invention.

FIG. 3C is a graph showing heat absorption rate into moderator material versus the number of MLI barriers, according to an embodiment of the present invention.

FIG. 3E is a table showing relative effectiveness of various moderator configurations in FIG. 3D, according to an embodiment of the present invention.

FIG. 4A is a diagram illustrating a nuclear reactor core and heat exchangers, according to an embodiment of the present invention.

FIG. 4B is a diagram illustrating a nuclear reactor core and heat exchangers, according to an embodiment of the present invention.

FIG. 4C is a diagram illustrating a nuclear reactor core and heat exchangers, according to an embodiment of the present invention.

FIG. 5A is a diagram illustrating a nuclear reactor core and heat exchangers, according to an embodiment of the present invention.

DETAILED DESCRIPTION OF THE EMBODIMENTS

Figure 1A:
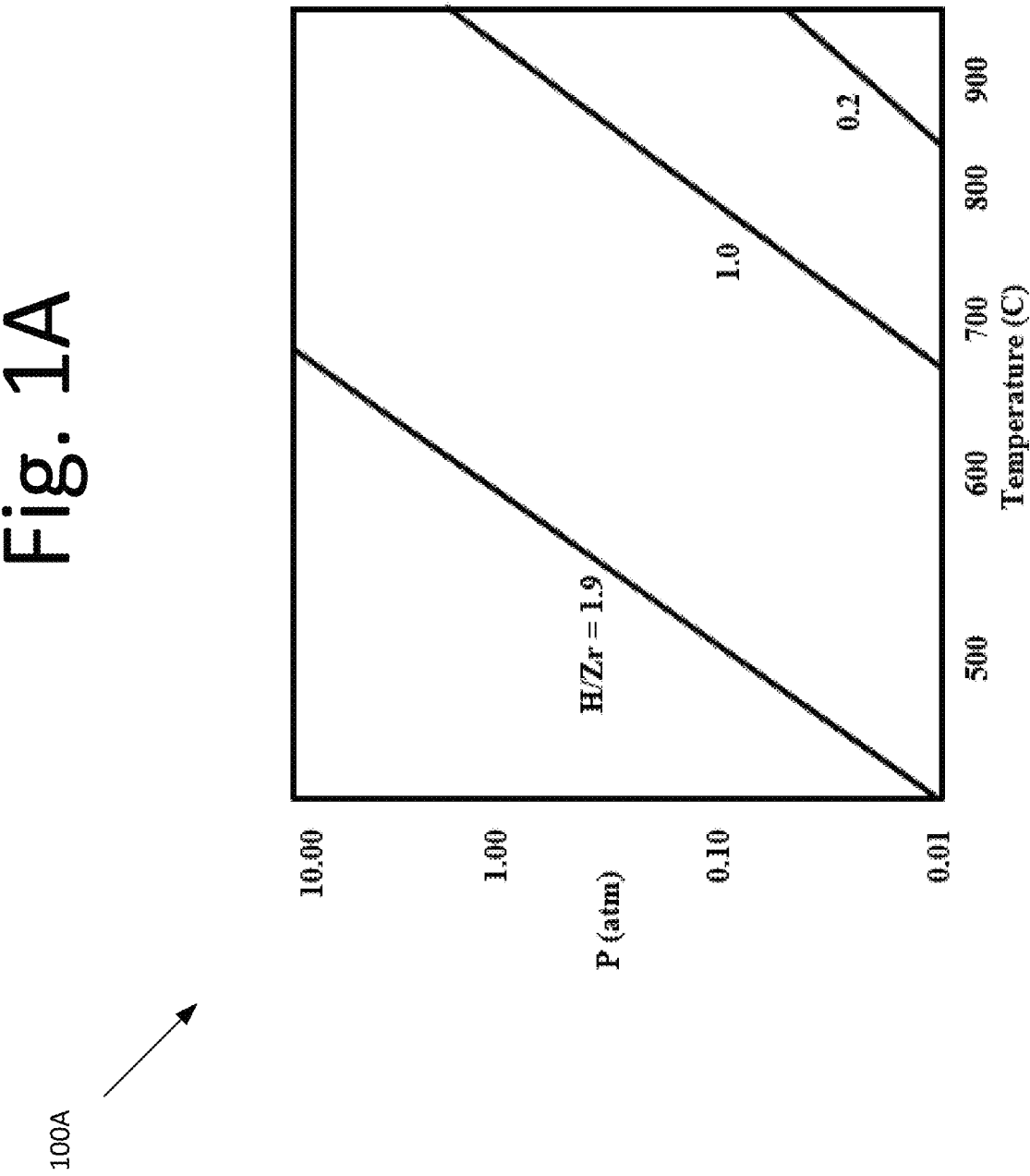
FIG. 1A is a graph illustrating isochores in the zirconium hydrogen system, according to an embodiment of the present invention.
Figure 1B:
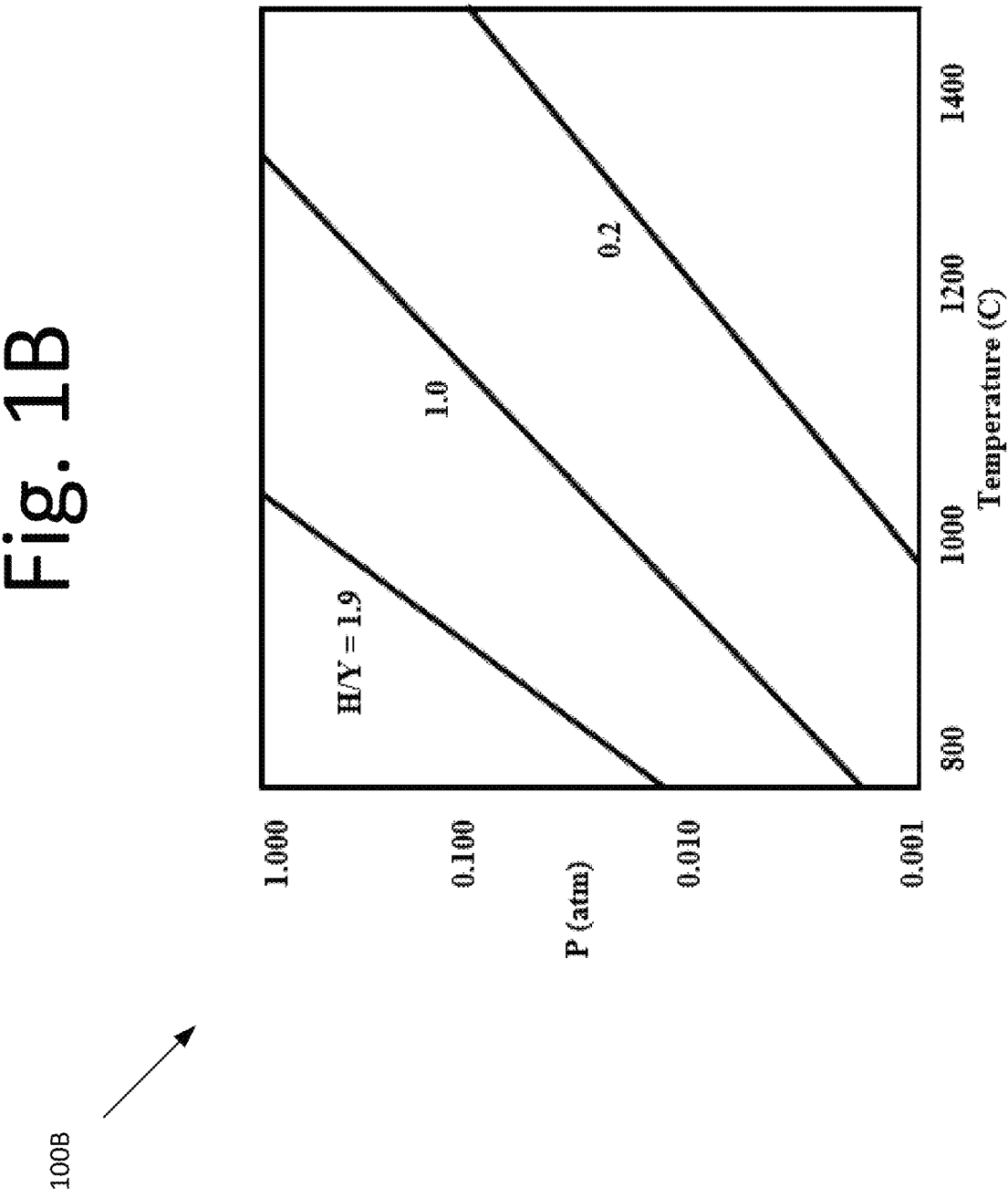
FIG. 1B is a graph illustrating isochores in the yttrium hydrogen system, according to an embodiment of the present invention.

Some embodiments generally pertain to a heat pipe cooled nuclear reactor core (either single or dual ended) comprising an array of fuel, an array of primary heat rejection heat pipes, and an array of moderator cooling heat pipes (or thermosiphons). Depending on the embodiment, the reactor core may be an all metal reactor core. The all metal reactor core will prevent the non-metallic impurities (e.g., carbon, oxygen, nitrogen) into the heat pipe. Without the all metal reactor core, these impurities may otherwise lead to de-wetting of the working fluid to the heat pipe wall and may also lead to corrosion. Each moderator cooling heat pipe is surrounded by metal hydride MH (YH or ZrH, for instance) moderator materials. As shown in FIGS. 1A and 1B, elements such as Y or Zr are exothermic hydrogen occluders where hydrogen concentration in the MH is inversely proportional to temperature. The moderator cooling heat pipes are coupled to one or more thermally controlled heat exchanges located adjacent to the core (near decay heat exchangers or core centerline, for instance). The moderators are surround by multilayer insulation (MLI) or other insulating materials to thermally isolate the moderator from the surrounding fuel-high temperature heat pipe matrix.

FIG. 1A is a graph 100A illustrating isochores in the zirconium hydrogen system, according to an embodiment of the present invention. Graph 100A shows hydrogen pressure (atm) versus temperature (° C.) for various zirconium hydrogen (H/Zr) stoichiometries. In this example, hydrogen exists with one-to-one stoichiometry at or around 1.0 atm near 1000° C. To prevent hydrogen permeation from the moderator system, it is desirable to keep hydrogen pressure as low as possible.

Suitable moderators possess high hydrogen to zirconium atomic ratios. For this reason, it may be desirable to keep hydrogen pressure low as possible while maintaining high hydrogen to zirconium atomic ratios (e.g., ~2.0). In FIG. 1A, for example, at a constant H/Zr ratio, hydrogen pressure may be reduced by lowering moderator temperature.

FIG. 1B is a graph 100B illustrating isochores in the yttrium hydrogen system, according to an embodiment of the present invention. At a given temperature and H/M ratio, the hydrogen pressure for the yttrium hydrogen system is much lower than the hydrogen pressure for the zirconium hydrogen system. See, for example, graph 100A in FIG. 1A.

FIG. 2A is a diagram illustrating a cross-section of a nuclear reactor core 200A, according to an embodiment of the present invention. The moderator is configured to slow neutrons from high energy (1-10 MeV) to epithermal or thermal energy range (e.g., less than 0.1 eV). The moderator cooling heat pipes are configured to maintain the moderator at a temperature sufficiently low to hold hydrogen.

In some embodiments, a structural matrix 202 may be composed of carbon, metal, or other material. Depending on the embodiment, structural matrix 202 may be moderating or non-moderating. Within structural matrix 202, primary heat pipes 204, fuel (rod) 206, insulation 211, and moderator 208 exist.

For purposes of explanation, fuel 206 generates heat, which is transferred to primary heat pipes 204. Primary heat pipes 204 transfer heat out of reactor core 200A to a heat exchanger (not shown), which produces heat for energy conversion cycle. For purposes of this embodiment, within moderator 208, moderator cooling heat pipes 210 and insulation 211 hold moderator 208 at a temperature below that of surrounding primary heat pipes 204 and fuel 206, keeping and optionally controlling the hydrogen-metal H/M atom ratio in moderator 208 to higher levels. Higher levels in this case include H/M atom ratios approaching 2/1. Depending on the heat balance associated with the insulation 211, moderator 208 temperature can be controlled by moderator cooling heat pipes 210 containing working fluids such as water or sodium.

As the metal hydride moderator temperature increases, hydrogen may evolve from the metal hydride material. This free hydrogen may undesirably diffuse into the heat pipes (i.e., primary heat pipes 204 and moderator cooling heat pipes 210). The diffused gas may migrate into the condenser regions of heat pipes 204 and 210, reducing condenser area exposed to heat rejection systems. This may reduce the effectiveness of heat pipes 204 and 210.

Reduction of hydrogen diffusion into heat pipes 204 and 210 may be accomplished by venting hydrogen gas from heat pipes 204 and 210 at the condenser end (not shown). It should be appreciated that other embodiments may use a different technique to accomplish a similar result.

FIG. 2B is a diagram illustrating a cross-section of a segment of a reactor core 200B (a unit cell), according to an embodiment of the present invention. In this embodiment, the cross-section includes fuel 212 that generates heat by nuclear fission. This heat is transferred to a high temperature matrix 214. Matrix 214 may be composed of moderator material (e.g., carbon) or monolithic material (e.g., metal). Heat is transferred from high temperature matrix 214 to heat pipes 216.

Each unit cell of fuel 212 and heat pipes 216 is surrounded by moderator 218 to slow neutrons from fast to thermal energy. In this embodiment, the cross-section includes fuel 212 that generates heat by nuclear fission. This heat is transferred to a high temperature matrix 214. Matrix 214 may be composed of moderator material (e.g., carbon) or monolithic material (e.g., metal). Heat is transferred from high temperature matrix 214 to primary heat pipes 216.

Metal hydride moderator 218 comprises a moderator cooled by moderator heat pipes 220A and 220B. Moderator 218 is insulated from surrounding matrix with multilayer insulation placed between the moderator 218 and the matrix 214.

FIG. 3A is a diagram illustrating a moderator assembly 300A according to an embodiment of the present invention. The moderator assembly 300A may be used in a nuclear reactor core assembly 200A found FIG. 2A. In some embodiments, moderator cooling assembly 300A includes a moderator cooling heat pipe 302 surrounded by a moderator 308. In some embodiments, moderator 308 comprises of only a metal hydride material, and in other embodiments, comprises of metal hydride material embedded into an open cell metal foam. This open cell foam allows for moderator cooling heat pipe 302 to more effectively cool moderator 308, allowing the heat pipe to maintain a higher hydrogen to metal ratio.

Moderator 308 is surrounded by one or more layers of MLI 312. MLI 312 may shield or insulate moderator (metal hydride) 308 from heat transfer, which emanates from the surrounding higher temperature fuel and primary heat pipes. The number of layers in MLI 312 depend on an optimization to maximize the moderator volume (cross sectional area) within the insulation, moderator, heat-pipe assembly. This optimization involves minimizing the insulation (thickness) and heat pipe (diameter) cross sectional areas. Fewer insulation layers (less insulation thickness and area) increase heat leak to the moderator. Increased heat leak requires more heat pipe capacity and heat pipe cross sectional area to keep the moderator at a given temperature. Conversely, more insulation layers (more insulating thickness and area) decrease heat leak to the moderator. Decrease heat leak requires less heat pipe capacity and heat pipe cross sectional area to keep the moderator at a given temperature.

Moderator assembly 300A may include a heat pipe 302 enclosed in a zirconium (Zr) clad-based tube 304. Zr clad-based tube 304 may be coated with a zirconium nitride (ZrN) hydrogen diffusion barrier by, for example, physical vapor deposition. See, for example, ZrN hydrogen diffusion barrier 306 in FIG. 3A.

Zirconium hydride (ZrH) or Yttrium hydride (YH) moderator 308 encloses ZrN hydrogen diffusion barrier 306 to moderate neutrons. In some embodiments, ZrH moderator 308 may be embedded in a porous open cell metal foam. This open cell foam enhances conductivity from heat pipe 302 to ZrH moderator 308. Continuing with ZrH moderator 308, this moderator is enclosed in a Zr clad-based tube. This Zr clad-based tube is coated with a ZrN hydrogen diffusion barrier 310 by, for example, physical vapor deposition.

Multilayer insulation (MLI) 312 surrounds ZrN hydrogen diffusion barrier, which can be placed on either side of surface 310. In certain embodiments, MLI 312 may be made of a Zr tube, foil, or sheet, to name a few. MLI insulation 312 includes a plurality of gaps in between each low emissivity layer. These gaps may be evacuated or may be filled with an inert gas such as nitrogen or argon. These gaps are evacuated to enhance insulation value of MLI. Alternatively, inert gas may be used to preserve hydrogen diffusion barrier.

An exterior metal can 314 may enclose all of the elements described above to protect the inner assembly from oxidation by air ingress. It should be noted that, if oxygen penetrates into the assembly, then the Zr may deteriorate. It should be noted that there is a matrix similar to that described and shown in 202 of FIG. 2A outside of exterior metal can 314.

Figure 3B:
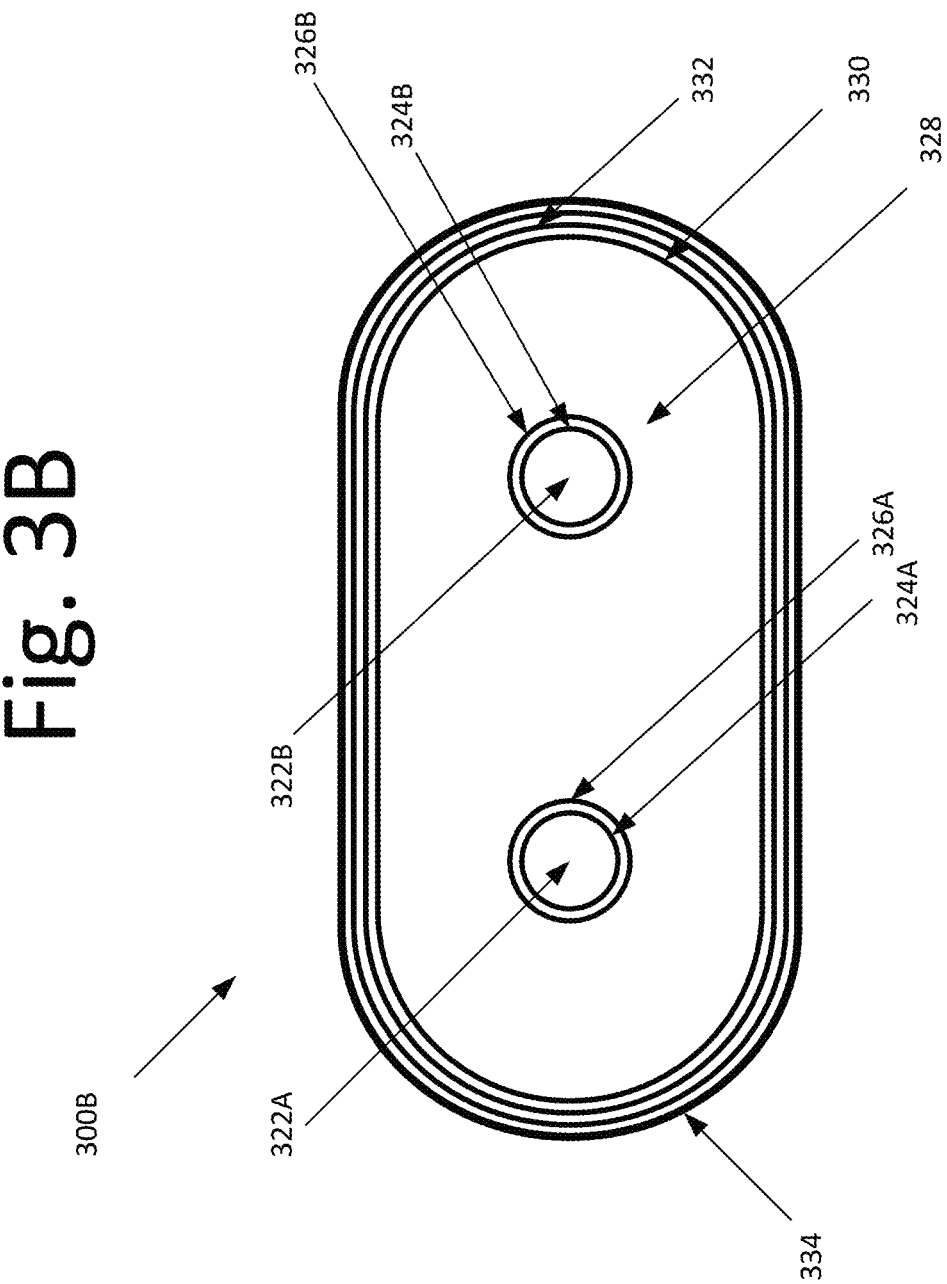
FIG. 3B is a diagram illustrating a moderator assembly in a nuclear reactor core, according to an embodiment of the present invention.

FIG. 3B is a diagram illustrating a moderator assembly 300B in a nuclear reactor core, according to an embodiment of the present invention. The moderator assembly 300B may be used in a nuclear reactor core assembly 200B found FIG. 2B. The assembly is analogous to that shown in FIG. 3A but comprises moderator cooling heat pipes 322A and 322B, Zr clad-based tubes 324A and 324B, ZrN hydrogen diffusion barrier 326A and 326B, Zirconium hydride (ZrH) or Yttrium hydride (YH) moderator 328, ZrN hydrogen diffusion barrier 330, Multilayer insulation (MLI) 332, and exterior metal can 334. The adjacent moderator heat pipes 322A and 322B are configured to uniformly cool the moderator 328.

FIG. 3C is a graph 300C showing heat absorption rate into moderator material versus the number of MLI barriers, according to an embodiment of the present invention. Heat from the reactor core is applied at boundary 2 shown in FIG. 3C. A series of N (e.g., the number of) MLI barriers with emissivity ε span the gap between boundaries 1 and 2. Between boundaries 1 and 0 exists a moderator material (e.g., ZrH) with thermal conductivity k.

Equation (1) below illustrates the mathematics behind the plot shown in graph 300C.

$$q = \frac{\sigma(T_2^4 - T_1^4)\pi 2r_2 L}{N(2/\epsilon - 1) + 1} = \frac{2\pi L k(T_1 - T_0)}{\ln(r_1/r_0)} \quad (1)$$

where L is the length of the reactor core, q is the heat absorption rate into the moderator, T is temperature at heat pipe outside radius 0, inner MLI surface 1, and outer MLI surface 2, respectively, and r is the radius at heat pipe outside radius 0, inner MLI surface 1, and outer MLI surface 2, respectively. The area marked 3 consists of the surrounding high temperature matrix that is assumed at the same temperature as outer MLI surface 2.

Figure 3D:
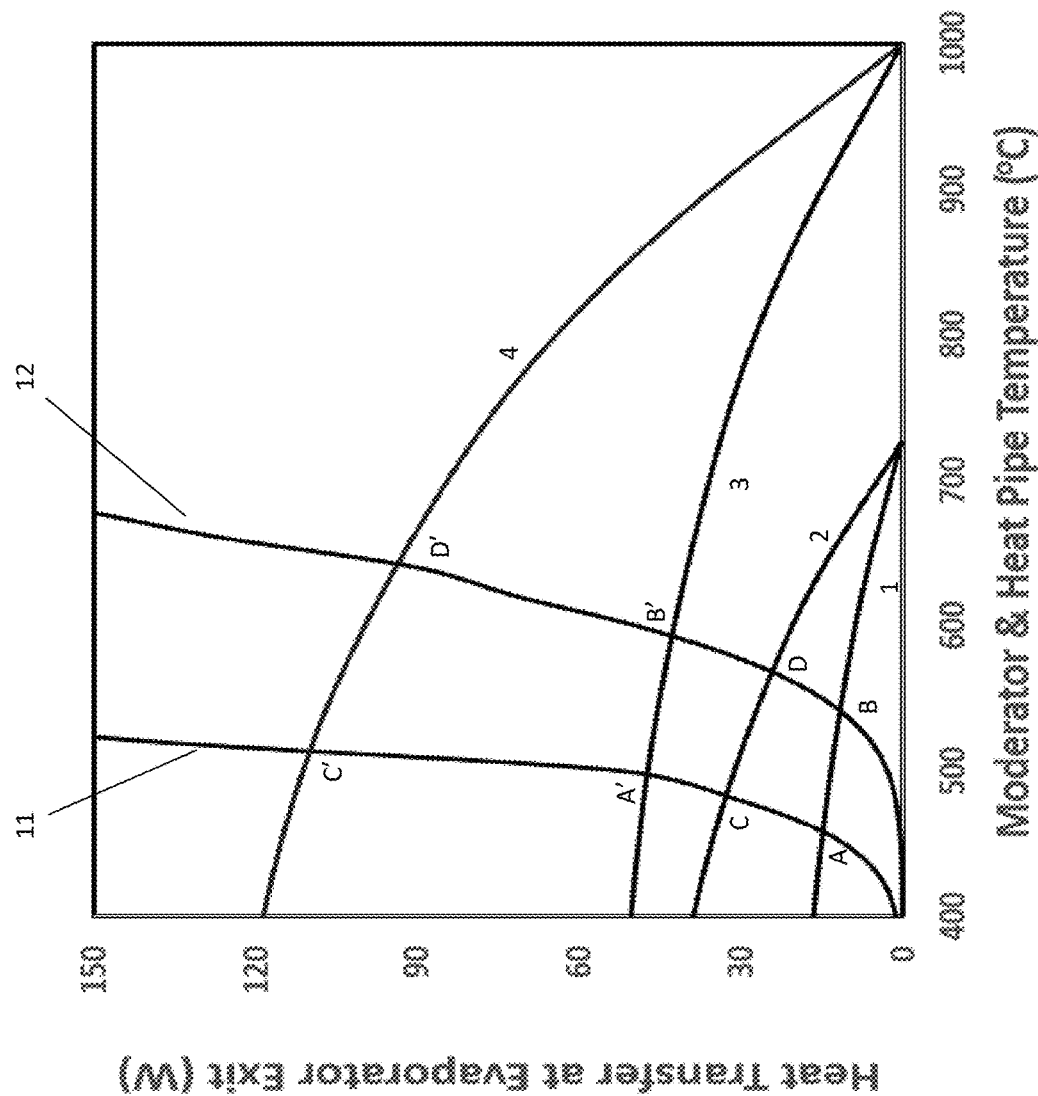
FIG. 3D is a graph showing heat transfer at the evaporator exit versus evaporator exit temperature for two heat pipes, according to an embodiment of the present invention.

FIG. 3D is a graph 300D showing heat transfer at the evaporator exit versus evaporator exit temperature for two heat pipes 11 and 12, according to an embodiment of the present invention. For the configuration considered the controlling thermal resistance is across the MLI. The temperature difference across the moderator is small and can be approximated as the heat pipe temperature. The two positively sloped curves marked 11 and 12 are heat pipe performance limit curves (heat pipe capacity) for 0.25 in diameter and 0.125 in diameter heat pipes, respectively. The two negatively sloped curves marked 1 and 2 plot the heat leak from a 700° C. reactor core matrix to the moderator/heat pipe for 3 and 1 layers of MLI, respectively. The other two negatively sloped curves marked 3 and 4 plot the heat leak from a 1000° C. reactor core matrix to the moderator/heat pipe for 3 and 1 layers of MLI, respectively.

In some embodiments, the heat pipe can operate with heat transfer at evaporator exit below curve marked 11 in FIG. 3D. Likewise, the heat pipe can operate with heat transfer at evaporator exit below curve marked 12 in FIG. 3D. The heat pipe is further limited by heat absorption across MLI layers, which is marked by curves 1-4. For example, the heat pipe associated with curve 11 with a single layer of MLI (see curve 4) may operate between 500 Celsius and a maximum fuel temperature of 1,000 Celsius along curve 4. For purposes of explanation, curve 4 is the coupling curve between the high temperature matrix (shown as 214 in FIG. 2B, for instance) and the moderator heat pipe (220A and 220B in FIG. 2B, for instance).

Although previously explained, curve 3 is a coupling curve between the neutron-moderator-material through a three MLI layers to a 1000° C. reactor. Curve 4 is a coupling curve between the neutron-moderator-material through a single MLI layer to a 1000° C. reactor. Curve 11 shows the capacity of a 0.250 in OD sodium heat pipe versus temperature at the evaporator exit. Curve 12 shows the capacity of a 0.125 in OD sodium heat pipe versus temperature at the evaporator exit.

Point A shows the intersection of Curve 1 and Curve 11 for a moderator element cooled by a 0.25 in OD sodium heat pipe. Three layers of MLI isolate the moderator material from the surrounding 700° C. reactor matrix. Point B shows the intersection of Curve 1 and Curve 12 for a moderator element cooled by a 0.125 in OD sodium heat pipe. Three layers of MLI isolate the moderator material from the surrounding 700° C. reactor matrix. Point C shows the intersection of Curve 2 and Curve 11 for a moderator element cooled by a 0.25 in OD sodium heat pipe. One layer of MLI isolates the moderator material from the surrounding 700° C. reactor matrix. Point D shows the intersection of Curve 2 and Curve 12 for a moderator element cooled by a 0.125 in OD sodium heat pipe. One layer of MLI isolates the moderator material from the surrounding 700° C. reactor matrix.

Point A' shows the intersection of Curve 3 and Curve 11 for a moderator element cooled by a 0.25 in OD sodium heat pipe. Three layers of MLI isolate the moderator material from the surrounding 1000° C. reactor matrix. Point B' shows the intersection of Curve 3 and Curve 12 for a moderator element cooled by a 0.125 in OD sodium heat pipe. Three layers of MLI isolate the moderator material from the surrounding 1000° C. reactor matrix. Point C' shows the intersection of Curve 4 and Curve 11 for a moderator element cooled by a 0.25 in OD sodium heat pipe. One layer of MLI isolates the moderator material from the surrounding 1000° C. reactor matrix. Point D' shows the intersection of Curve 4 and Curve 12 for a moderator element cooled by a 0.125 in OD sodium heat pipe. One layer of MLI isolates the moderator material from the surrounding 1000° C. reactor matrix.

Note that the volume occupied by the 0.25 in OD heat pipe and 3 MLI layers reduce the volume available to the moderator compared with designs having smaller heat pipe diameter and fewer MLI layers.

For a fixed moderator assembly cross sectional area there are three principal components: the heat pipe, the moderator, and the MLI. Maximizing the amount of hydrogen in the reactor involves the competing trends of keeping the moderator cool with the MLI and the heat pipes and keeping the moderator cross sectional area (or volume) as large as possible in the available space. Increases in heat pipe and MLI cross sectional area reduce moderator temperature, but they reduce available cross sectional area for the moderator. The relative mass of hydrogen for a given assembly configuration at a particular moderator pressure and temperature can be estimated with the hydrogen metal ratio found in FIGS. 1A and 1B, along with heat transfer and geometry information from Equation 1.

$$\frac{m_H(T_{moderator}, P_{moderator}) \sim n_H(T_{moderator}, P_{moderator})}{A_{moderator}} \quad (2)$$

where $A_{moderator}$ is the cross-sectional area of the moderator in the moderator assembly, $T_{moderator}$ is the mean temperature of the moderator, $P_{moderator}$ is the pressure of the moderator, and $n_H$ is the relative concentration of hydrogen atoms in the moderator, and $m_H$ is the total relative mass of hydrogen atoms in the moderator.

$$q = \frac{\sigma(T_{core}^4 - T_{moderator}^4)\pi 2 r_{core} L}{N(2/\epsilon - 1) + 1} = \frac{2\pi L k (T_{moderator} - T_{heatpipe})}{\ln(r_{moderator}/r_{heatpipe})} \quad (3)$$

For clarity purposes, it should be noted that the equation in (3) is equivalent to the equation in (1), and only consists of different nomenclatures.

With this, FIG. 3D can be used to determine which of the four points marked A-D, carry the most hydrogen using the above equation. FIG. 3E is a table showing relative effectiveness of various moderator configurations in FIG. 3D, according to an embodiment of the present invention. Temperature has a strong effect on hydrogen density for the ZrH moderator. For the ZrH moderator configuration, C carries the most hydrogen owing to the combined temperature effects on hydrogen density. Also shown in FIG. 3E is the heat leak, $Q_{leak}$, from the high temperature matrix to the moderator cooling heat pipe for each configuration. Configurations with high $A_{moderator}$ n also tend to have higher $Q_{leak}$. The heat leak $Q_{leak}$, per moderator assembly is still small compared to total reactor power. A moderated heat pipe reactor comprising of ~1000 primary heat pipes may typically produce 1 to 10 MW of power. The $Q_{leak}$ penalty from ~1000 moderator heat pipes from this same configuration would vary from 30 kW to 300 kW: ~3% of the power transferred from the heat pipe reactor through the primary heat pipes.

Coupling of a fixed conductance or a variable conductance heat pipe or thermosiphon to the heat sink across the gap with controlled composition and thermal conductivity may control the temperature of the moderator inside the core. This gas gap may be used alone with a fixed conductance heat pipe or thermosiphon or combined with a variable conductance heat pipe or thermosiphon to control moderator temperature.

FIG. 4A is a diagram illustrating a nuclear reactor core and heat exchangers 400A, according to an embodiment of the present invention. Nuclear heat is generated in reactor core 402 and is transferred to primary heat pipes 404 that reject heat to power conversion heat exchanger 406. In the core is an array of moderator elements comprising MLI, moderator material, and moderator heat pipe 414. In some embodiments, moderator heat pipe 414 may be referred to as moderator heat pipe assembly 414. For a more detailed description of moderator heat pipe assembly 414 in the reactor core, please see FIG. 3A and the corresponding description, as an example embodiment. On the top half of FIG. 4A, moderator heat pipe 414 transfers heat to a moderator heat exchanger 416 located just outside of the core 402 on the same said as the power conversion heat exchanger 406. In an alternative embodiment shown on the bottom half of the FIG. 4A, moderator heat pipe 414 transfers heat to moderator heat exchanger 420 located just outside of the core 402 on the opposite side as the power conversion heat exchanger 406.

It should be appreciated that moderator heat pipe temperature may be controlled by some combination of heat pipe non-condensable gas loading and/or heat exchanger coupling via variable composition gas gap.

Controlling moderator heat pipe 414 or thermosiphon coupling to a heat sink permits positive control of moderator and moderator heat pipe 414 or moderator thermosiphon temperature. Coupling control can be achieved through a gap between the moderator heat pipe 414 and heat exchanger 416 or 420 containing a variable composition of gas, for instance, a variable composition mixture of helium and argon. The gas mixture may control the thermal conductivity of the gas.

The conductance across a gap 418 may control the thermal coupling between moderator heat pipe 414 and moderator heat exchanger 416. Moderator heat exchanger 416 controls the temperature of moderator heat pipe 414 at a different (most likely lower) temperature than primary heat pipe 404.

Gas gap 418 containing a variable composition of gas, for instance, a variable composition mixture of helium and argon. The gas mixture may control the thermal conductivity of the gas. Coupling of a fixed conductance or a variable conductance heat pipe or thermosiphon to the heat sink across the gap with controlled composition and thermal conductivity may control the temperature of the moderator inside the core. This gas gap may be used alone with a fixed conductance heat pipe or thermosiphon or combined with a variable conductance heat pipe or thermosiphon to control moderator temperature.

FIG. 4B is a diagram illustrating a nuclear reactor core and heat exchangers 400B, according to an embodiment of the present invention. The configuration is similar to FIG. 4A except a gas added to the moderator heat pipes to enable variable conductance heat pipe operation. Once moderator heat pipe 416 reaches a certain vapor pressure, the gas front will reside near the condenser end of moderator heat pipe 414 shown at gas regions 417 and 437. If gas loaded, the gas loading may be either a fixed quantity of gas or a variable quantity of gas which is introduced into the heat pipe or the thermosiphon to control its condenser length and to control its coupling to the heat sink. Gas regions 417 and 437 may be of constant mass or may have a variable mass through gas injection and suction through an access port (not shown). Gas regions at 417 and 437 control coupling between the heat pipe condenser and heat exchangers 415 and 435.

FIG. 4C is a diagram illustrating a nuclear reactor core and heat exchangers 400C, according to an embodiment of the present invention. The configuration is similar to FIGS. 4A and 4B except the moderator cooling heat exchangers 450, 460, 470, and 480 are located on either end of the nuclear reactor core 400C. In the top rendering, the heat exchangers have a simple gas gap thermal feature linking the moderator heat pipe condensers to the heat exchangers 450 and 460. In the bottom rendering, heat exchangers 470 and 480 have two thermal control features linking the moderator heat pipe condensers to heat exchangers 470 and 480, a gap between the heat pipe and the heat exchanger and gas control, either fixed or variable, inside the heat pipe.

It should be appreciated that one or more of the embodiments shown in FIG. 4C may be used or incorporated within the embodiments discussed and shown in FIG. 5 of application Ser. No. 16/186,090, which is incorporated herein by reference.

FIG. 5A is a diagram illustrating a nuclear reactor core and heat exchangers 500A, according to an embodiment of the present invention. In some embodiments, reactor 502 produces heat that is transferred to primary heat exchanger heat pipes 504. Primary heat exchanger heat pipes 504 then transfers the heat through primary heat exchanger 510 to produce electricity, for example.

Moderator heat pipe assembly 506 is composed of one or more moderator heat pipes, metal hydride moderator, and MLI. Moderator heat pipe assembly 506 may reduce temperature of the moderator to prevent de-hydride of the moderator in reactor core 502. Moderator heat pipe assembly 506 extends out of reactor core 502 and into moderator heat pipe heat exchanger 508. In this region, moderator heat pipe assembly 506 is in thermal contact with the heat exchanger. In this region, there is no MLI or moderator. The reason for configuration is to regulate temperature of the metal hydride moderator in moderator heat pipe assembly 506. For example, remove residual heat transferred from reactor core 502 through moderator heat pipe assembly 506 and heat may be removed from the heat pipes in moderator heat pipe heat exchanger 508.

Figure 5B:
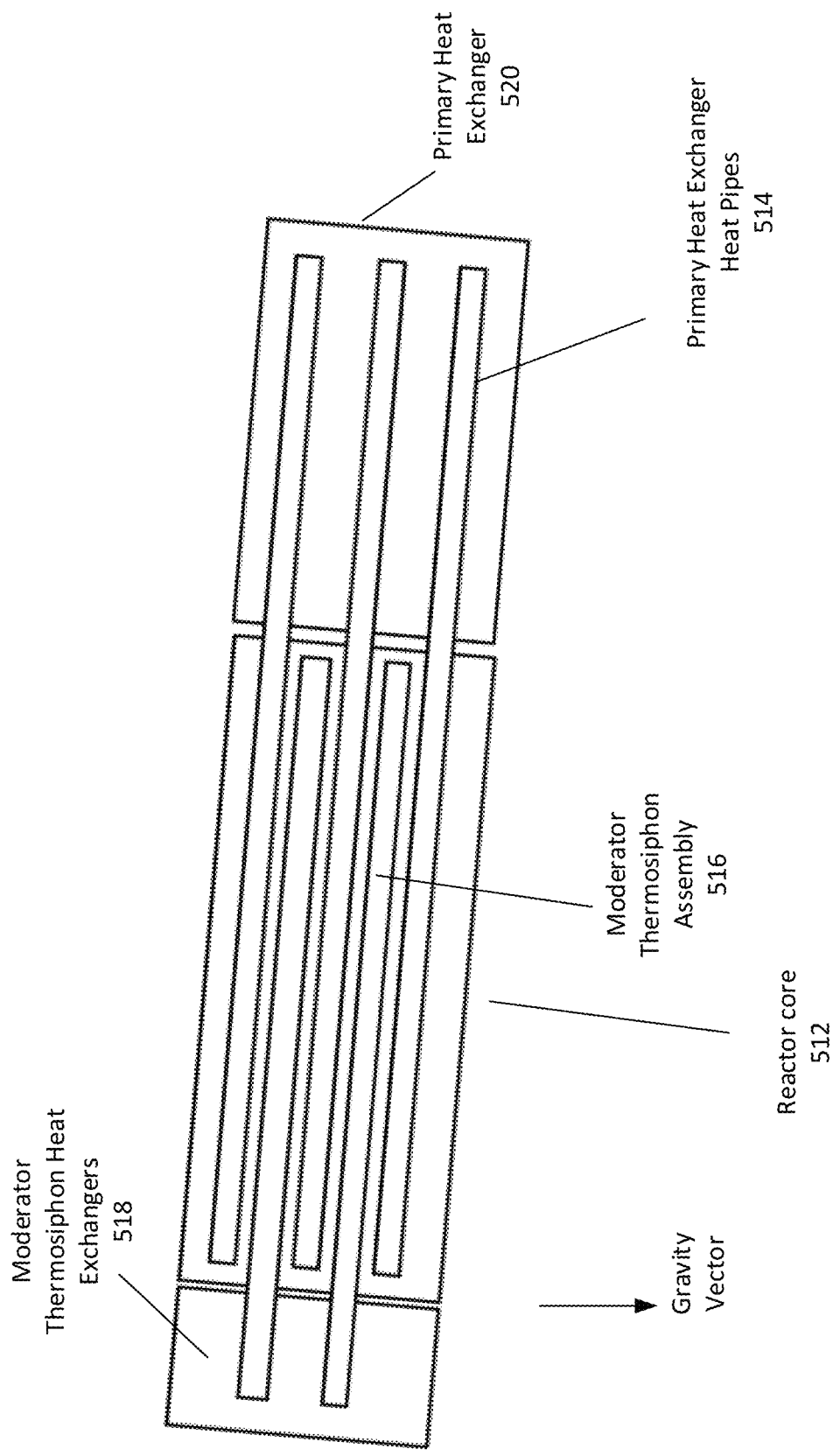
FIG. 5B is a diagram illustrating a nuclear reactor core with dual heat exchangers, according to an embodiment of the present invention.

As an introduction to FIG. 5B, in embodiments that use ZrH moderators, water heat pipes or water thermosiphons may be used. Water thermosiphons contain, in the core region, water across the entire cross-section. Water contains hydrogen, which is another material that can be used to moderate neutrons. This may provide further moderation of neutrons and may have some advantages over heat pipes that have less hydrogen bearing material across the cross-section. This may be equally true for embodiments that use YH moderators. For example, in embodiments that use a YH system, sodium heat pipes or sodium thermosiphons may also be used to remove heat from the moderator.

FIG. 5B is a diagram illustrating a nuclear reactor core with dual heat exchangers 500B, according to an embodiment of the present invention. A gravity vector is shown in FIG. 5B for purposes of illustration of orientation of the thermosiphon with respect to gravity. In some embodiments, reactor core 512 produces heat that is transferred to primary heat exchanger heat pipes 514 and some heat is leaked into moderator thermosiphon assembly 516. Primary heat exchanger heat pipes 514 transfers the heat through primary heat exchanger 520 to produce electricity, for example.

Moderator thermosiphon assembly 516 is composed of one or more moderator thermosiphons, metal hydride moderator, and MLI. Moderator thermosiphon assembly 516 may reduce temperature of the moderator within moderator thermosiphon 516 to prevent de-hydride of the moderator in reactor core 512. Moderator thermosiphon assembly 516 extends out of reactor core 512 and into moderator thermosiphon heat exchanger 518. In this region, moderator thermosiphon assembly 516 is in thermal contact with the heat exchanger in moderator thermosiphon heat exchanger 518. In this region, there is no MLI or moderator. The reason for configuration is to regulate temperature of the metal hydride moderator in moderator thermosiphon assembly 516. For example, remove residual heat transferred from reactor core 512 through moderator thermosiphon assembly 516 and heat may be removed from the thermosiphons in moderator thermosiphon heat exchanger 518.

In this embodiment, for moderator thermosiphon assembly 516 to operate, reactor core 512 should be titled a few degrees above the horizontal plane so that moderator thermosiphon heat exchanger 518 is slightly elevated compared to that of reactor core 512. For the case of water thermosiphons, water may be used to fill the entire cross section of moderator thermosiphons to the end of the reactor core. The moderator thermosiphon working fluid serves a dual purpose as a coolant and a moderator at the same time. Further, a tilt of a few degrees above the horizontal plane would significantly degrade the performance of primary heat exchanger heat pipes 514.

Figure 5C:
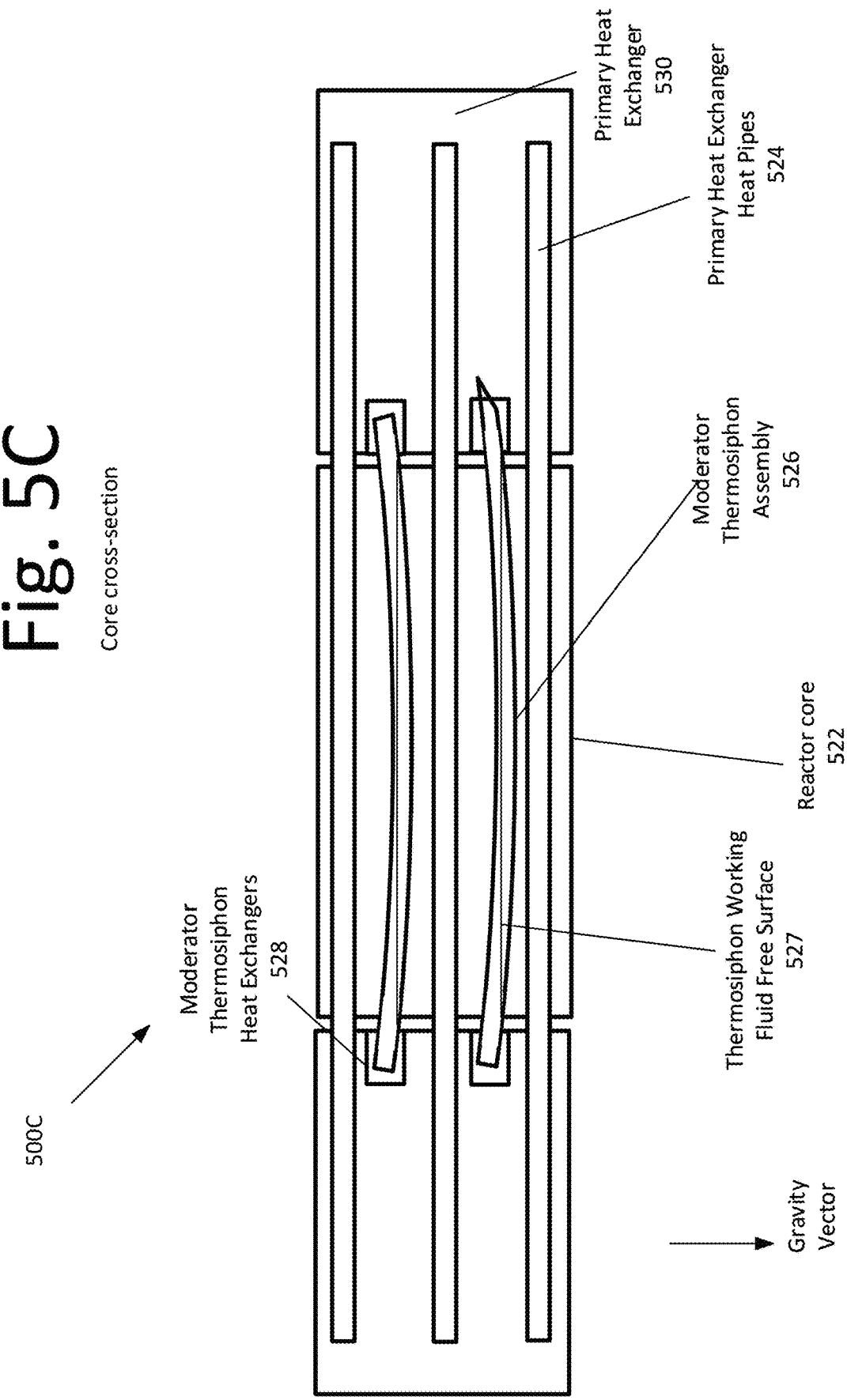
FIG. 5C is a diagram illustrating a nuclear reactor core with dual primary heat exchangers, according to an embodiment of the present invention.

FIG. 5C is a diagram illustrating a nuclear reactor core with dual primary heat exchangers 500C, according to an embodiment of the present invention. A gravity vector is shown in FIG. 5C for purposes of illustration of orientation of the thermosiphon with respect to gravity.

In some embodiments, reactor core 522 produces heat that is transferred to primary heat exchanger heat pipes 524 and some heat is leaked into moderator thermosiphon assembly 526. Primary heat exchanger heat pipes 524 transfers the heat through primary heat exchanger 530 to produce electricity, for example.

Moderator thermosiphon assembly 526 is composed of one or more moderator thermosiphons, metal hydride moderator, and MLI (not shown). Moderator thermosiphon assembly 526 may reduce temperature of the moderator within moderator thermosiphon 526 to prevent de-hydride of the moderator in reactor core 522. Moderator thermosiphon assembly 526 extends out of reactor core 522 and into moderator thermosiphon heat exchanger 528. In this region, moderator thermosiphon assembly 526 is in thermal contact with the heat exchanger in moderator thermosiphon heat exchanger 528. In this region, there is no MLI or moderator. The reason for configuration is to regulate temperature of the metal hydride moderator in moderator thermosiphon assembly 526. For example, remove residual heat transferred from reactor core 522 through moderator thermosiphon assembly 526 and heat may be removed from the thermosiphons in moderator thermosiphon heat exchanger 528.

In this embodiment, for moderator thermosiphon assembly 526 to operate, thermosiphon working fluid free surface 527 are curved or bent allowing for the liquid to return to reactor core 522. The curvature may be a few degrees, ranging from 0 to 10 degrees. For the case of water thermosiphons, water may be used to fill the entire cross section of moderator thermosiphons to the end of the reactor core. The moderator thermosiphon working fluid serves a dual purpose as a moderator coolant and a moderator at the same time.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A heat pipe cooled nuclear reactor core comprising:
a structural matrix surrounding at least a portion of an array of fuel, at least a portion of an array of primary heat rejection heat pipes, and at least a portion of an array of moderator assemblies,
wherein each moderator assembly of the array of moderator assemblies comprises:
a moderator cooling heat pipe or thermosiphon;
a metal hydride moderator material slowing neutrons from a fission energy range to a lower energy range in the reactor core; and
a multilayer insulation comprising a plurality of gaps, each gap being evacuated or filled with an inert gas,
wherein the metal hydride moderator material surrounds the moderator cooling heat pipe or thermosiphon and the multilayer insulation surrounds the metal hydride moderator material and thermally isolates the metal hydride moderator material and the moderator cooling heat pipe or thermosiphon of each moderator assembly from the structural matrix.

2. The reactor core of claim 1, wherein the metal hydride moderator material is composed of yttrium hydride or zirconium hydride.

3. The reactor core of claim 2, wherein multilayer insulation comprises at least three insulation layers.

4. The reactor core of claim 1, wherein at least one of the primary heat rejection heat pipes is thermally coupled to a power conversion heat exchanger disposed externally of the structural matrix.

5. The reactor core of claim 4, wherein at least one of the moderator assemblies is thermally coupled to a moderator heat exchanger disposed externally of the structural matrix.

6. The reactor core of claim 5, wherein the moderator heat exchanger is disposed on the same side of the structural matrix as the power conversion heat exchanger.

7. The reactor core of claim 1, wherein, within each moderator assembly, the moderator cooling heat pipe or thermosiphon contains water or sodium as a working fluid.

8. The reactor core of claim 1, wherein the structural matrix comprises a moderator material.

9. The reactor core of claim 1, wherein the metal hydride moderator material is embedded into an open cell metal foam.

10. The reactor core of claim 1, wherein one or more of the moderator assemblies further comprises one or more of a second moderator cooling heat pipe or thermosiphon, a Zirconium clad-based tube, a Zirconium nitride hydrogen diffusion barrier, an exterior metal can, or any combination thereof, wherein each moderator heat pipe or thermosiphon is configured to uniformly cool the metal hydride moderator material.

11. The reactor core of claim 1, wherein the multilayer insulation comprises a series of N multilayer insulation barriers comprising tubes, foil, or sheets comprising zirconium.

12. The reactor core of claim 1, wherein at least one moderator assembly of the array of moderator assemblies further comprises:
a first hydrogen diffusion barrier disposed between the moderator cooling heat pipe or thermosiphon and the surrounding metal hydride moderator material; and
a second hydrogen diffusion barrier disposed between the metal hydride moderator material and the surrounding multilayer insulation.

13. The reactor core of claim 12, wherein the at least one moderator assembly of the array of moderator assemblies further comprises:
a second moderator cooling heat pipe or thermosiphon comprising a third hydrogen diffusion barrier disposed between the second moderator cooling heat pipe or thermosiphon and the surrounding metal hydride moderator material.

14. The reactor core of claim 13,
wherein a first zirconium clad-based tube is disposed between the moderator cooling heat pipe or thermosiphon and the first hydrogen diffusion barrier,
wherein a second zirconium clad-based tube is disposed between the second moderator cooling heat pipe or thermosiphon and the third hydrogen diffusion barrier, and
wherein an exterior metal can is disposed between the multilayer insulation and a surrounding structural matrix of the reactor core.

15. A heat pipe cooled nuclear reactor core comprising:
an array of fuel, an array of primary heat rejection heat pipes, and an array of moderator assemblies,
wherein each moderator assembly of the array of moderator assemblies comprises;
a moderator cooling heat pipe or thermosiphon;
a metal hydride moderator material composed of yttrium hydride or zirconium hydride, the metal hydride moderator material slowing neutrons from a fission energy range to a lower energy range in the reactor core;

a multilayer insulation comprising a plurality of gaps, each gap being evacuated or filled with an inert gas; and a first hydrogen diffusion barrier and a second hydrogen diffusion barrier, wherein the metal hydride moderator material surrounds the moderator cooling heat pipe or thermosiphon, the multilayer insulation surrounds the metal hydride moderator material, the first hydrogen diffusion barrier is disposed between the moderator cooling heat pipe or thermosiphon and the metal hydride moderator material, and the second hydrogen diffusion barrier layer is disposed between the metal hydride moderator material and the multilayer insulation.

16. The reactor core of claim 15, further comprising a structural matrix surrounding the array of primary heat rejection heat pipes, the array of fuel, and the array of moderator assemblies.

17. The reactor core of claim 15,
wherein the metal hydride moderator material of at least one moderator assembly is embedded into an open cell metal foam.

18. The reactor core of claim 15, wherein at least one of the first or second hydrogen diffusion barriers comprises zirconium nitride, and wherein one or more of the moderator assemblies further comprises one or more of a second moderator cooling heat pipe or thermosiphon, a zirconium clad-based tube, an exterior metal can, or any combination thereof.

19. The reactor core of claim 15, wherein the metal hydride moderator material is disposed between a first pair of boundaries defined by an outside surface of the first hydrogen diffusion barrier and an inner surface of the multilayer insulation, and wherein the multilayer insulation comprises a series of N multilayer insulation barriers spanning a gap between a second pair of boundaries defined by the inner surface of the multilayer insulation and an outer surface of the multilayer insulation.

20. The reactor core of claim 19, the reactor core further comprising a structural matrix surrounding at least a portion of the array of primary heat rejection heat pipes, at least a portion of the array of fuel, and at least a portion of the array of moderator assemblies, wherein a number of multilayer insulation barriers is at least three.

* * * * *

UNITED STATES PATENT AND TRADEMARK OFFICE
CERTIFICATE OF CORRECTION

PATENT NO. : 12,176,113 B1  
APPLICATION NO. : 17/176752  
DATED : December 24, 2024  
INVENTOR(S) : Robert Stowers Reid It is certified that error appears in the above-identified patent and that said Letters Patent is hereby corrected as shown below:

In the Claims

In Column 12, Line 57, Claim 15, delete "core" and insert -- core, --, therefor.

In Column 12, Line 61, Claim 15, delete "comprises;" and insert -- comprises: --, therefor.

Signed and Sealed this  
Sixth Day of May, 2025

Coke Morgan Stewart  
*Acting Director of the United States Patent and Trademark Office*